(12) United States Patent
Son et al.

(10) Patent No.: US 7,497,626 B2
(45) Date of Patent: Mar. 3, 2009

(54) SPINDLE MOTOR STRUCTURE AND HARD DISK DRIVE EMPLOYING THE SAME

(75) Inventors: Young Son, Yongin-si (KR); Jeong-seok Koh, Yongin-si (KR); Joo-young Kwak, Seoul (KR); Jae-hyuk Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 11/257,097

(22) Filed: Oct. 25, 2005

(65) Prior Publication Data

US 2006/0165323 A1 Jul. 27, 2006

(30) Foreign Application Priority Data

Jan. 21, 2005 (KR) .................. 10-2005-0005809

(51) Int. Cl.
*F16C 32/06* (2006.01)
*G11B 17/02* (2006.01)
*H02K 7/08* (2006.01)

(52) U.S. Cl. .................. 384/100; 310/90; 360/99.08

(58) Field of Classification Search .................. 384/100, 384/107–124; 360/99.08, 98.07; 310/90; 417/554

See application file for complete search history.

(56) References Cited

U.S. PATENT DOCUMENTS

| 4,488,192 | A | * | 12/1984 | Treseder | .................. 360/97.03 |
| 5,103,335 | A | * | 4/1992 | Sugiura | .................. 310/90 |
| 5,664,889 | A | * | 9/1997 | Gustafson | .................. 384/114 |
| 6,236,129 | B1 | * | 5/2001 | Yamashita | .................. 310/90 |
| 6,741,420 | B2 | * | 5/2004 | Jennings et al. | .................. 360/99.08 |
| 6,961,199 | B2 | * | 11/2005 | Onda et al. | .................. 360/69 |

FOREIGN PATENT DOCUMENTS

| JP | 05-166291 A | 7/1993 |
| JP | 2001-178075 A | 6/2001 |
| KR | 2001-0010451 A | 2/2001 |
| KR | 2003-0043681 A | 6/2003 |

* cited by examiner

*Primary Examiner*—Thomas R Hannon
(74) *Attorney, Agent, or Firm*—Sughrue Mion, PLLC

(57) ABSTRACT

A spindle motor structure including a spindle motor installed on a base and having a hydrodynamic bearing supporting a shaft to be capable of rotating using hydrodynamic pressure and a driving source rotating the shaft using an electromagnetic force. A circuit board is installed to face the base and supplies driving power to the driving source. A heater is installed on the circuit board at a position facing the hydrodynamic bearing and heats the hydrodynamic bearing.

10 Claims, 5 Drawing Sheets

SPINDLE MOTOR STRUCTURE AND HARD DISK DRIVE EMPLOYING THE SAME

CROSS-REFERENCE TO RELATED PATENT APPLICATIONS

This application claims priority from Korean Patent Application No. 10-2005-0005809, filed on Jan. 21, 2005, in the Korean Intellectual Property Office, the disclosure of which is incorporated herein in its entirety by reference.

BACKGROUND OF THE INVENTION

1. Field of the Invention

The present invention relates to a spindle motor structure supported by a hydrodynamic bearing and a hard disk drive employing the same and, more particularly, to a spindle motor structure which can smoothly rotate a spindle motor in a low temperature atmosphere by heating the spindle motor without structural modification of the spindle motor itself, and a hard disk drive employing the same.

2. Description of the Related Art

Hard disk drives (HDDs) are one type of information storage media that record data on a disk rotated by a spindle motor or reproduce data from the disk using a read/write head.

FIG. 1 is an exploded perspective view of a conventional hard disk drive. FIG. 2 is a cross-sectional view showing a part of the hard disk drive of FIG. 1. Referring to FIGS. 1 and 2, a hard disk drive 10 includes a base 11 and a cover member 12 coupled to the base 11. A spindle motor 30 for rotating a disk 20 and an actuator 40 for moving a read/write head 44 to a desired position on the disk 20 are installed on the base 11.

The actuator 40 includes a swing arm 42 rotatably coupled to an actuator pivot 41 installed on the base 11, a suspension 43 installed at an end portion of the swing arm 42 and supporting the head 44 to be elastically biased toward the disk 20, and a voice coil motor 50 for rotating the swing arm 42.

A printed circuit board 70 is coupled to a lower surface of the base 11 with an insulation plate 60 interposed therebetween. Semiconductor chips 71 and various circuit elements 73 to operate the spindle motor 30, the read/write head 44, and the actuator 40 are mounted on the printed circuit board 70.

The spindle motor 30 includes a stator 31 fixed to the base 11, a rotor 33 rotatably installed with respect to the stator 31 and for fixing the disk 20 thereon, a hydrodynamic bearing 35 provided between the stator 31 and the rotor 33 and supporting the rotor 33 to be capable of rotating, and a magnetic driving portion 39 for providing a rotational driving force to the rotor 33.

The hydrodynamic bearing 35 includes a journal bearing portion 36 supporting a rotation shaft 33a of the rotor 33 in a radial direction, a thrust bearing portion 37 supporting the rotation shaft 33a in an axial direction, and fluid 38 injected into the journal bearing portion 36 and the thrust bearing portion 37. Thus, the hydrodynamic bearing 35 generates dynamic pressure as the fluid 38 injected between the journal and thrust bearing portions 36 and 37 and the rotation shaft 33a forms an oil film, when the disk 20 is rotated by the magnetic driving portion 39. Thus, the hydrodynamic bearing 35 can reduce a frictional load by supporting the rotation shaft 33a to be capable of rotating in a state in which the stator 31 and the rotor 33 do not contact each other. In the meantime, the performance of the spindle motor with the hydrodynamic bearing configured as above may be deteriorated at low temperature.

FIG. 3 is a graph showing a change in friction torque according to a change in the temperature of the hydrodynamic bearing. Referring to FIG. 3, in a hard disk drive employing a hydrodynamic bearing, when the ambient temperature is about 15° C. or more, the friction torque of the thrust bearing portion is about $1.5 \times 10^{-4}$ [Nm] or less while the friction torque of the journal bearing portion is about $0.5 \times 10^{-4}$ [Nm] or less, which do not generate any special problems. However, when the ambient temperature goes down under 5° C., since viscosity of the fluid increases, the friction torque between each of the journal and thrust bearing portions and the rotation shaft increases. For example, in reviewing the change in the frictional torque according to the change in the temperature of the thrust bearing portion, the frictional torque is about $3.1 \times 10^{-4}$ [Nm] at -5° C. while, at -10° C., the friction torque drastically increases to about $4.2 \times 10^{-4}$ [Nm]. That is, it can be seen that the amount $\Delta T_f$ of change in the friction torque according to the difference of 5 degrees is about $1.1 \times 10^{-4}$ [Nm] which is very large.

Thus, according to the above result, the hard disk drive employing the hydrodynamic bearing has problems that driving current needed to rotate the spindle motor increases at a temperature below zero, in particular, under -5° C., and normal rotation driving is not possible within a predetermined time.

To solve these problems, Japanese Patent Laid-Open Publication No. 5-166291 (published on Jul. 2, 1993 and entitled "Spindle Motor of Magnetic Disk Apparatus") discloses a method of increasing a rotation speed of the spindle motor by decreasing viscosity of the fluid by heating the hard disk drive. The disclosed apparatus has a heater in the spindle motor so that the viscosity of a lubrication agent is decreased by heating the spindle motor using the heater in a low temperature environment.

However, since the disclosed apparatus has a structure of including the heater inside the spindle motor, the structure of the spindle motor is complicated and costs therefore increase.

Also, in configuring the hard disk drive employing the hydrodynamic bearing, its performance is maximized only when the spindle motor having the above-described complicated heater structure is employed. When the spindle motor which does not include the heater structure as shown in FIG. 2 is employed, the problem that the driving of the spindle motor is still difficult due to the increase in the friction torque in a low temperature environment.

SUMMARY OF THE INVENTION

To solve the above and/or other problems, the present invention provides a spindle motor structure which can smoothly drive the spindle motor in a low temperature environment by heating the spindle motor having a hydrodynamic bearing structure, without modifying the structure of the spindle motor itself, and a hard disk drive employing the same.

According to an aspect of the present invention, a spindle motor structure comprises a spindle motor installed on a base and having a hydrodynamic bearing supporting a shaft which is operative to rotate using hydrodynamic pressure and a driving source rotating the shaft using an electromagnetic force, a circuit board installed to face the base and which supplies driving power to the driving source, and a heater installed on the circuit board at a position facing the hydrodynamic bearing and which heats the hydrodynamic bearing.

According to another aspect of the present invention, a hard disk drive comprises a base, a spindle motor installed on the base and having a hydrodynamic bearing supporting a shaft which is operative to rotate using hydrodynamic pressure and a driving source rotating the shaft using an electromagnetic force, at least one disk installed on the shaft of the spindle motor and for storing data, an actuator installed on the base and operative to pivot and move a read/write head, which performs reading and writing of data with respect to the disk, to a desired position on the disk, a circuit board installed to face the base and which electrically operates the read/write head and the driving source, and a heater installed on the circuit board at a position facing the hydrodynamic bearing and for heating the hydrodynamic bearing.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 1:
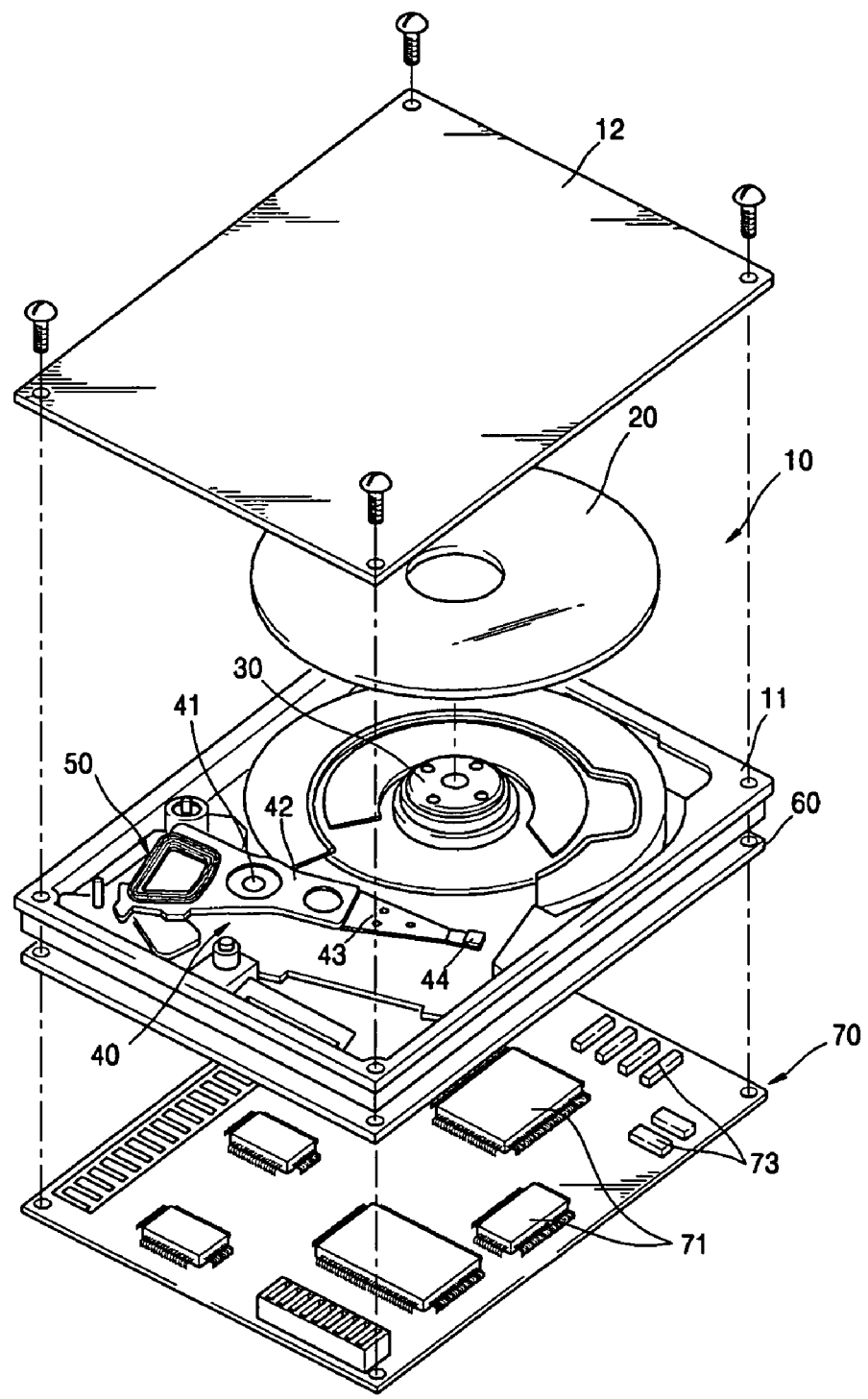
FIG. 1 is an exploded perspective view of a conventional hard disk drive.
Figure 2:
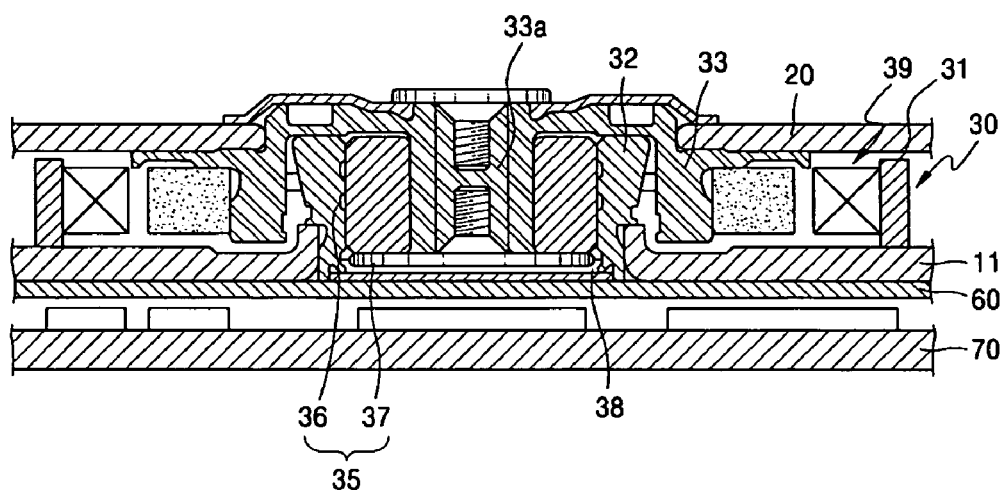
FIG. 2 is a cross-sectional view showing a part of the hard disk drive of FIG. 1.
Figure 3:
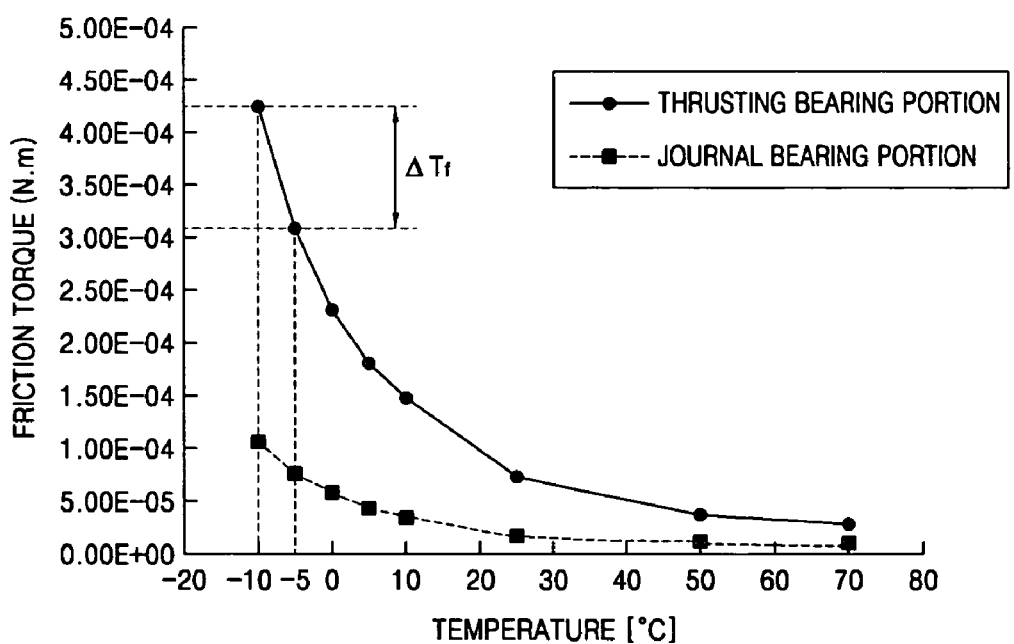
FIG. 3 is a graph showing a change in friction torque according to a change in the temperature of the hydrodynamic bearing.
Figure 4:
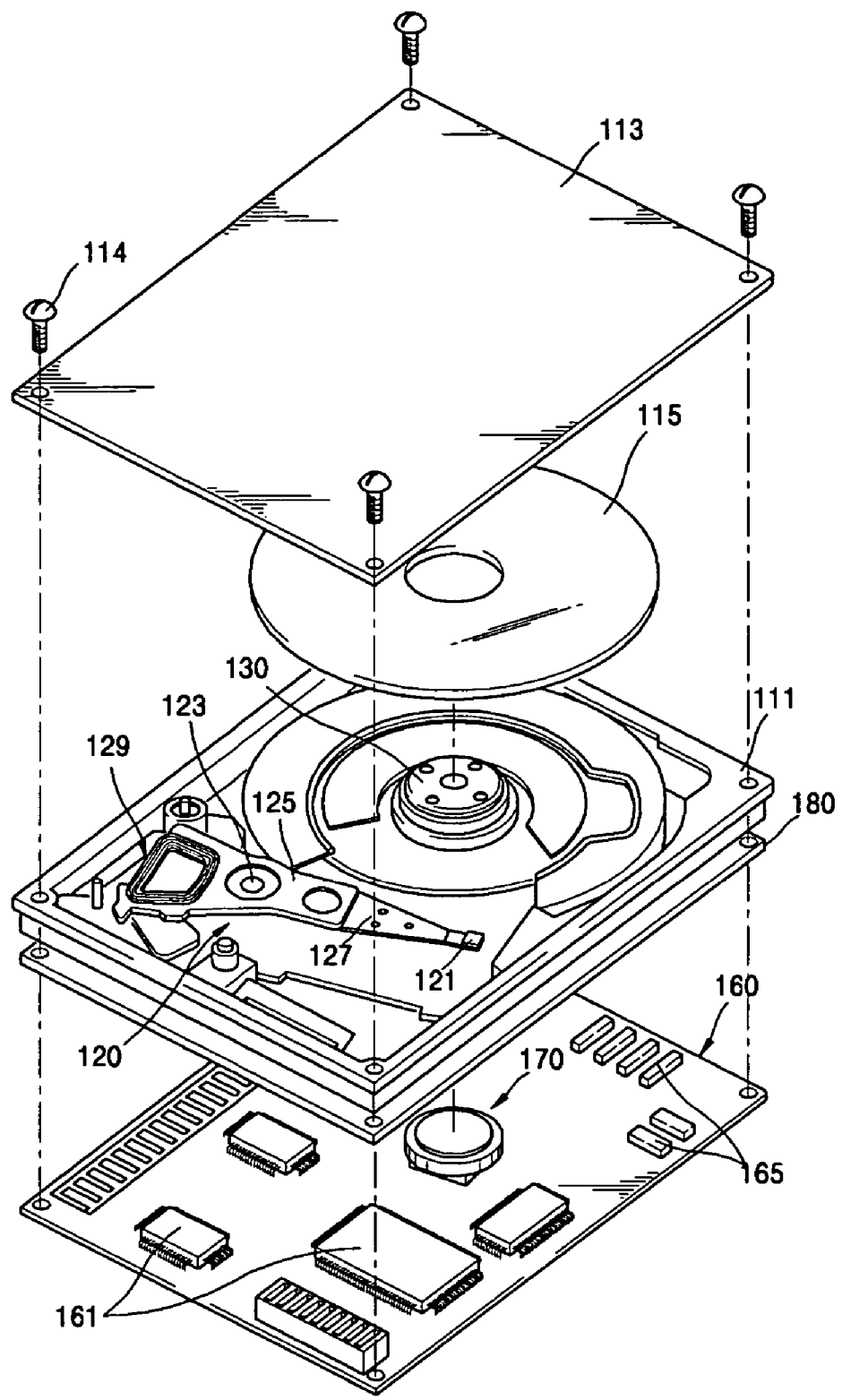
FIG. 4 is an exploded perspective view of a hard disk drive consistent with an exemplary embodiment of the present invention.
Figure 5:
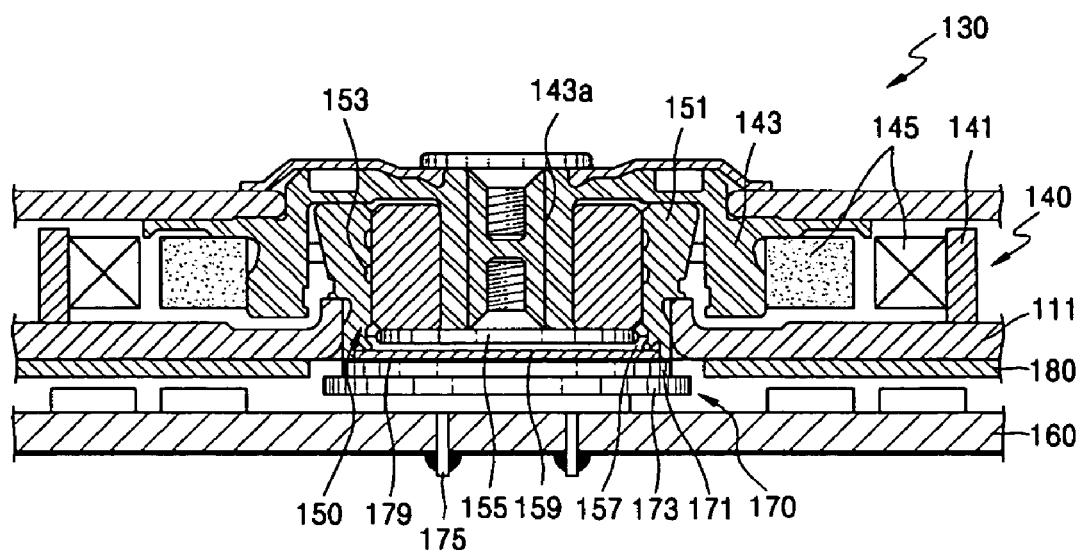
FIG. 5 is a cross-sectional view showing a part of the hard disk drive of FIG. 4.

Referring to FIGS. 4 and 5, a hard disk drive according to an exemplary embodiment of the present invention includes a base 111, a read/write head 121 performing reading/writing of data with respect to the disk 115, an actuator 120 installed on the base 111 and driving the head 121, and a spindle motor structure 130 rotating the disk 115.

A cover member 113 protecting constituent elements installed on the base 111 is coupled to the base 111 using screws 114. Thus, the constituent elements such as the disk 115, the read/write head 121, and the actuator 120 provided in space between the base 111 and the cover member 113 can be protected.

The disk 115 has a structure of at least one disk and is installed on the spindle motor structure 130 and a shaft 143a and rotated. The actuator 120 includes a swing arm 125 rotatably coupled to an actuator pivot 123 installed on the base 111, a suspension 127 installed at one end portion of the swing arm 125 and supporting the read/write head 121 to be elastically biased toward the disk 115, and a voice coil motor 129 for rotating the swing arm 125.

The spindle motor structure 130 includes a spindle motor 140, a circuit board 160, and a heater 170. The spindle motor 140 includes a stator 141 fixed to the base 111, a rotor 143 rotatably installed with respect to the stator 141 and for fixing the disk 115 thereon, a hydrodynamic bearing 150 provided inside the rotor 143 and supporting the rotor 143 to be capable of rotating, and a driving source 145 together with the stator 141 for rotating the shaft 143a by an electromagnetic force.

The hydrodynamic bearing 150 includes a bearing housing 151 having inner space into which fluid 157 is injected, a journal bearing portion 153 formed on the inner surface of the bearing housing 151 and supporting the shaft 143a in a radial direction, a thrust bearing portion 155 provided inside the bearing housing 151 and supporting the shaft 143a in an axial direction, and a cap member 159 coupled to an end portion of the bearing housing 151 and supporting a lower portion of the thrust bearing portion 155. Thus, the hydrodynamic bearing 150 generates dynamic pressure as the fluid 157 injected between the journal and thrust bearing portions 153 and 155 and the rotation shaft 143a forms an oil film, when the disk 115 is rotated by the driving source 145. Accordingly, the hydrodynamic bearing 150 can reduce a frictional load by supporting the rotation shaft 143a to be capable of rotating in a state in which the bearing housing 151 and the rotor 143 do not contact each other.

When the spindle motor 140 is not driven, the fluid 157 is mainly located at a lower portion of the bearing housing 151 due to the self weight of the fluid 157, that is, around the thrust bearing portion 155.

The circuit board 160 is installed to face the base 111 and supplies driving power to the driving source 145. Also, the circuit board 160 electrically operates the read/write head 121 and the actuator 120. A plurality of semiconductor chips 161 and electric circuit elements are mounted on the circuit board 160 for this purpose.

The heater 170 is installed on the circuit board 160 at a position facing the hydrodynamic bearing 150. The heater 170 heats the fluid 157 injected into the bearing housing 151 in a low temperature environment to reduce viscosity of the fluid 157 so that friction torque of the thrust bearing portion 155 during initial driving is reduced.

To this end, the heater 170 includes a heating portion 171 heated when current is applied, an insulation body 173, and connection terminals 175 electrically connected to the circuit board 160 and applying current to the heating portion 171. The insulation body 173 constitutes a body of the heater 170 and is arranged between the heating portion 171 and the circuit board 160 to prevent transfer of heat generated from the heating portion 171 to the circuit board 160. The heating portion 171 is manufactured on the insulation body 173 by, for example, coating or plating a nickel-chromium based heating body. The heating portion 171 contacts a lower portion of the cap member 159 to directly heat the cap member 159. Thermal grease 179 is coated on a contact portion between the cap member 159 and the heating portion 171 so as to increase the thermal transfer rate.

Figure 6:
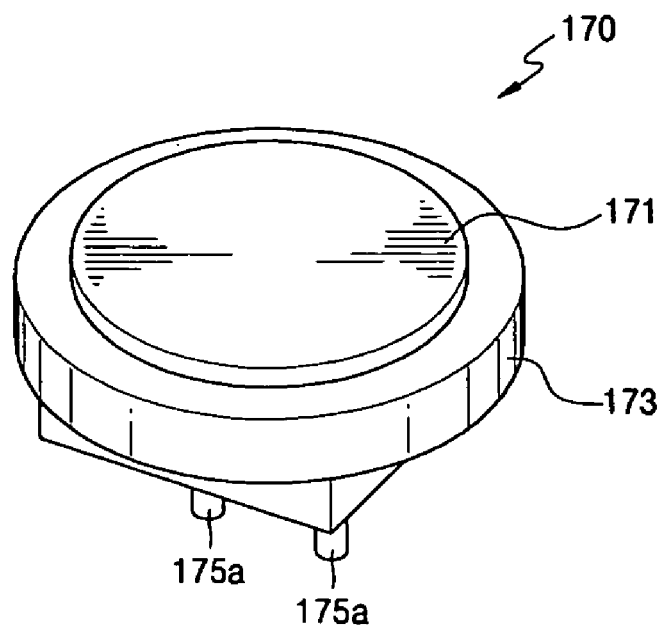
FIG. 6 is a perspective view of an on-PCB heater consistent with an exemplary embodiment of the present invention.
Figure 7:
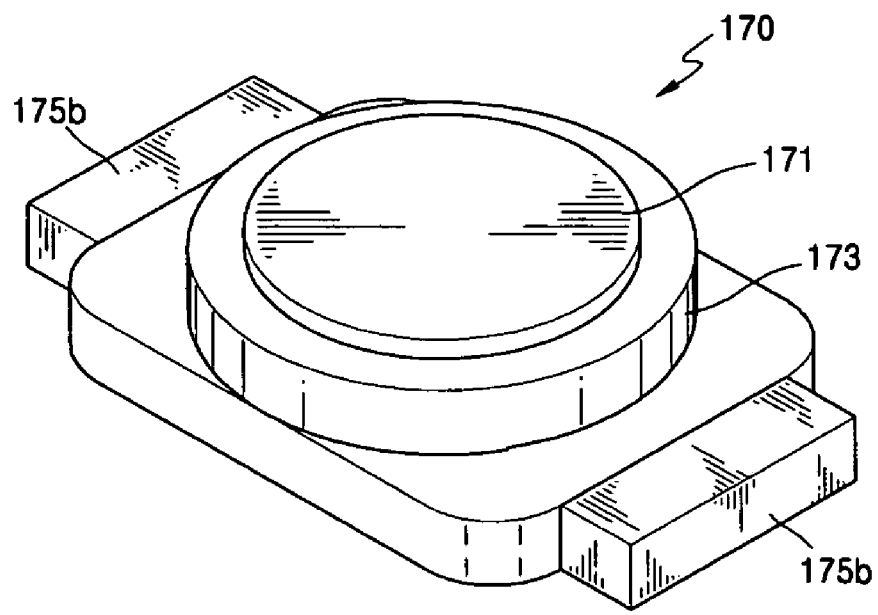
FIG. 7 is a perspective view of an on-PCB heater consistent with another exemplary embodiment of the present invention.

The heater 170 may have a shape as shown in FIGS. 6 and 7 according to the type of the connection terminal 175. FIG. 6 shows a pair of leads 175a protruding from a lower portion of the insulation body 173 as a connection terminal. In this case, as shown in FIG. 5, the leads 175a are coupled to a coupling hole (not shown) provided on the circuit board 160 and connected to an electrically conductive path on the circuit board 160, for example, through soldering, so that the installation of the heater 170 is completed. FIG. 7 shows a pair of leads 175b extending from side portions of the insulation body 173 as a connection terminal. In this case, as the leads 175b are surface-mounted with respect to a bonding pad (not shown) on the circuit board 160, the heater 170 can be installed.

When the ambient temperature of the spindle motor structure 130 is low and thus viscosity of the fluid 157 increases so that the disk 115 does not rotate in a normal fashion, the heater 170 heats the fluid 157 to decrease the viscosity thereof. Thus, defective driving due to the friction torque caused during the initial driving in a low temperature environment can be prevented. When the rotation speed of the disk 115 is detected as being below a normal speed, the heater 170 heats the fluid 157 until the rotation speed of the disk 115 becomes normal. Therefore, the spindle motor structure 130 can be normally driven in a low temperature environment without a temperature detection sensor measuring the ambient temperature.

Also, an insulation member 180 is further provided between the spindle motor 140 and the circuit board 160, except for the position of the heater 170. The insulation member 180 electrically insulates the circuit board 160 from the base 111 positioned above the circuit board 160.

The spindle motor structure configured as above consistent with the present invention including the heater can prevent defective initial driving of the spindle motor by heating the fluid constituting the hydrodynamic bearing to decrease the viscosity of the fluid in a low temperature environment.

Furthermore, by providing a structure of mounting the heater on the circuit board to heat the fluid, the spindle motor can be smoothly driven in a low temperature environment without structural modification of the spindle motor itself having a hydrodynamic bearing structure. Therefore, when a hard disk drive is constituted by employing a general spindle motor, the structure thereof can be simplified and manufacturing costs can also be reduced.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A spindle motor structure comprising:
   a spindle motor installed on a base and having a hydrodynamic bearing supporting a shaft which is operative to rotate using hydrodynamic pressure and a driving source rotating the shaft using an electromagnetic force;
   a circuit board installed to face the base and which supplies driving power to the driving source; and
   a heater installed on the circuit board at a position facing the hydrodynamic bearing and which heats the hydro dynamic bearing;
   wherein the heater comprises:
      a heating portion which receives current and generates heat;
      an insulation body arranged between the heating portion and the circuit board and for insulating the transfer of the heat generated from the heating portion to the circuit board; and
      a connection terminal electrically connected to the circuit board.

2. The spindle motor structure as claimed in claim 1, wherein the hydro dynamic bearing comprises:
   a bearing housing having inner space into which fluid is injected;
   a journal bearing portion disposed in the bearing housing and which supports the shaft in a radial direction;
   a thrust bearing portion disposed in the bearing housing and which supports the shaft in an axial direction; and
   a cap member coupled to an end portion of the bearing housing and supporting a lower portion of the thrust bearing portion.

3. The spindle motor structure as claimed in claim 2, wherein the heating portion contacts a lower portion of a cap member and directly heats the cap member.

4. The spindle motor structure as claimed in claim 3, wherein thermal grease is coated on a contact portion between the cap member and the heating portion to increase a thermal transfer rate.

5. The spindle motor structure as claimed in claim 1, further comprising an insulation member provided between the spindle motor and the circuit board, except for a position of the heater and for electrically insulating the circuit board from the base.

6. A hard disk drive comprising:
   a base;
   a spindle motor installed on the base and having a hydro dynamic bearing supporting a shaft which is operative to rotate using hydrodynamic pressure and a driving source rotating the shaft using an electromagnetic force;
   at least one disk installed on the shaft of the spindle motor and for storing data;
   an actuator installed on the base and operative to pivot and move a read/write head, which performs reading and writing of data with respect to the disk, to a desired position on the disk;
   a circuit board installed to face the base and which electrically operates the read/write head and the driving source; and
   a heater installed on the circuit board at a position facing the hydrodynamic bearing and for heating the hydrodynamic bearing;
   wherein the heater comprises:
      a heating portion which receives current and generates heat;
      an insulation body arranged between the heating portion and the circuit board and for insulating the transfer of the heat generated from the heating portion to the circuit board; and
      a connection terminal electrically connected to the circuit board.

7. The hard disk drive claimed in claim 6, wherein the hydrodynamic bearing comprises:
   a bearing housing having inner space into which fluid is injected;
   a journal bearing portion disposed in the bearing housing and which supports the shaft in a radial direction;
   a thrust bearing portion disposed in the bearing housing and which supports the shaft in an axial direction; and
   a cap member coupled to an end portion of the bearing housing and supporting a lower portion of the thrust bearing portion.

8. The hard disk drive as claimed in claim 7, wherein the heating portion contacts a lower portion of a cap member and directly heats the cap member.

9. The hard disk drive as claimed in claim 8, wherein thermal grease is coated on a contact portion between the cap member and the heating portion to increase a thermal transfer rate.

10. The hard disk drive as claimed in claim 6, further comprising an insulation member provided between the spindle motor and the circuit board, except for a position of the heater and for electrically insulating the circuit board from the base.

* * * * *